United States Patent [19]

Noel

[11] 4,207,810

[45] Jun. 17, 1980

[54] CUP AND COVER TURNOVER MECHANISM FOR ENGLISH MUFFIN GRIDDLES

[76] Inventor: Eugene M. Noel, 1215 S. Portofino Dr., Sarasota, Fla. 33581

[21] Appl. No.: 38,839

[22] Filed: May 14, 1979

[51] Int. Cl.[2] ............................................. A47J 37/00

[52] U.S. Cl. ......................................... 99/373; 99/423; 99/443 C

[58] Field of Search ..................... 99/443 C, 373, 372, 99/426, 427; 198/404, 424, 570; 425/182, 439, 453

[56] References Cited

U.S. PATENT DOCUMENTS

| | | | |
|---|---|---|---|
| 2,700,939 | 2/1955 | Liston | 99/443 C |
| 2,859,713 | 11/1958 | Noel | 99/372 |
| 2,962,984 | 12/1960 | Noel | 99/427 |
| 4,106,400 | 8/1978 | Noel | 99/373 |

*Primary Examiner*—Billy J. Wilhite
*Attorney, Agent, or Firm*—Charles W. Rummler

[57] ABSTRACT

A cup and cover turnover mechanism for muffin grilling griddles having a cup flight which straddle mounts spaced roller chains of a cover and hearth flight, wherein the conveying chains of each of said flights engage identical sprockets which mount for rotation about the turnover axis of the griddle and coordinate each cup thereon in fixed relation with a cover as the muffin is bottom-grilled and turned over on the pitch circles of said sprockets for top-grilling on the hearth flight of the griddle.

2 Claims, 5 Drawing Figures

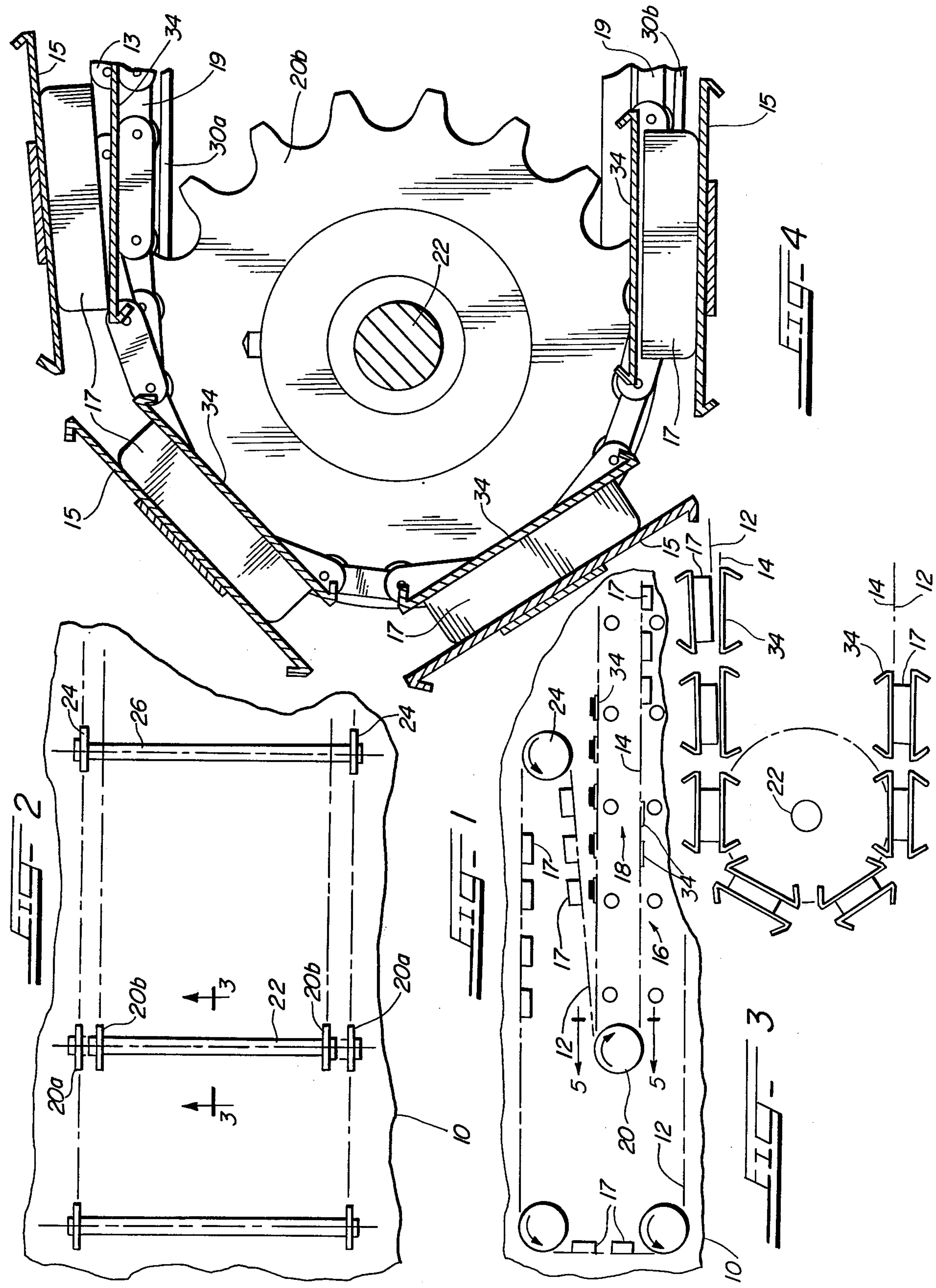

10
28a
28b
20a
20b
13
11
12
23
30a
30b
15
19
14
32
17
34
22
4

CUP AND COVER TURNOVER MECHANISM FOR ENGLISH MUFFIN GRIDDLES

BACKGROUND OF THE INVENTION

In the manufacture of shaped muffins, both top and bottom of the muffin must be grilled. Uniform grilling and shaping of the muffin is done by passing the bottoms of the same over a line of burners with a cover on the top of the cup containing the muffin. Top-grilling turns the muffin over onto a hearth plate and removes the cup while passing it back over a second line of burners placed above the first line of the same. A turnover mechanism turns the muffins over in the cup under cover between bottom and top-grilling on a continuous basis.

The muffin grilling griddle of this invention is of the type described in U.S. Pat. No. 4,106,400.

There is an established need for a muffin cup and cover turnover mechanism for continuous grilling griddles.

The proper control of a muffin during the turnover for grilling the top side is of the utmost importance. If the partially grilled dough is allowed to slide, or rub on a stationery surface, it can (and does) stick and tear the muffin surface. If the partially grilled doughpiece is allowed to fall from its proper relationship between the top and the bottom of the grilling cup, it will be misshapen and commonly considered a "Cripple" or a product unworthy of packaging for sale. They will be sloped on top instead of level. They will not handle in following equipment such as prescorers and splitters. They will not fit into toasters either. A properly made English muffin should be approximately the same size as the depth inside and the i.d. of the cup in which it was grilled. The top and bottom should be parallel.

SUMMARY OF THE INVENTION

The gist of this invention lies in a mechanism for transport of shaped muffins on continuous grilling griddles having turnover axles so that a cup-and-cover relation contains the muffin during turnover on the griddle. A cup flight operationally straddle-mounts a cover flight on the griddle. Identical strands of roller chain convey both cup and cover flights during transport and turnover on common pitch circles and common pitch planes. Identical sprockets mount on the turnover axle with sprocket teeth mutually fixed in coordinated circumferential relation. Each chain engages a respective sprocket. Cup-and-cover brackets tie opposing strands of chain carrying each cup-and-cover flight and move in circumferential relation about the turnover axle with the cup flight radially outside of the cover flight. Cups mount on the cup brackets with rims in the pitch planes of the chains and tangent to the pitch circles of the turnover sprockets. Covers mount on the cover brackets in coordinate angular and linear relation with undersides on the pitch planes and tangent to the pitch circles of the same, but in extension from the opposite side thereof; so that transport and turnover of the cups and covers are always in cup-and-cover relation.

DESCRIPTION OF THE DRAWINGS

FIG. 1 shows a fragmentary schematic side view of the cup-and-cover flights of this muffin grilling griddle turnover invention;

FIG. 2 shows a fragmentary schematic plan view of FIG. 1;

FIG. 3 shows a fragmentary schematic detail cross-section view along line 3—3 of FIG. 2;

FIG. 4 shows a fragmentary cross-section view along line 4—4 of FIG. 1; and

DESCRIPTION OF THE PREFERRED EMBODIMENT

Figure 5:
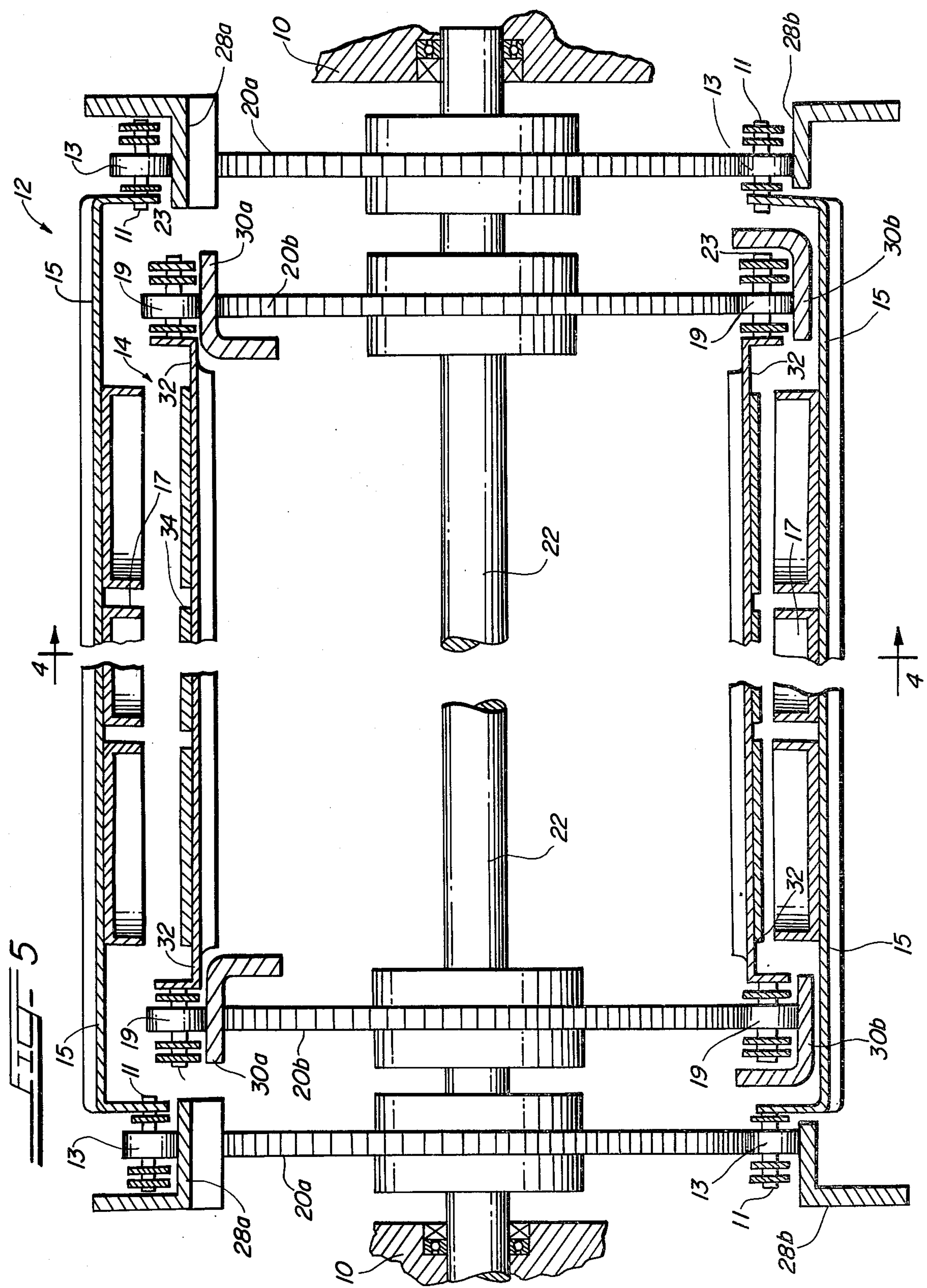
FIG. 5 shows a fragmentary cross-section view along line 5—5 of FIG. 4.

Reference to FIG. 1 shows a frame 10 of an English muffin grilling griddle having a plurality of lower burner ports 16 spaced at one level therealong and an upper plurality of burner ports 18 spaced thereabove. A turnover axle 22 mounts on the left end of the frame 10. Cup-and-cover turnover sprockets **20*a* and 20*b* each having the same pitch diameters and the same size and number of sprockets teeth mount in circumferentially-coordinated and longitudinally-spaced relation on axle 22, as shown in FIG. 2. Axle 22 journals in frame 10 to the left of and at a level between that of burner ports 16 and 18**.

Cover turnover sprockets **20*b* mount between cup turnover sprockets 20*a* on axle 22. Cup return sprockets (not shown) having the same tooth size as cup turnover sprockets 20*a* journal in frame 10 on the right of and below the level of burner ports 16. Cup lift sprockets 24, as shown in FIG. 2, having the same tooth size and pitch as cup turnover sprockets 20*a* mount on axle 26 which journals in frame 10 above burner ports 18**.

A cup flight 12 engages both cup turnover and lift sprockets **20*a* and 24, as shown in FIG. 3, and slides in relation upwardly from the one to the other in support of the rollers of chain strands 13 on inclined pitch planes on upper tracks 28*a* which mount on frame 10. Cup flight 12 slides horizontally in the direction of cup turnover sprockets 20*a* from cup return sprockets (not shown) on lower tracks 28*b*. Bracket members 15 pivotally mount on roller centerpins 11 which are pinned through the links of the strands of chain 13 on the pitch plane of the same and extend across the cup flight 12 in support of a plurality of cups 17 spaced in coordinated transverse relation therealong. Cup turnover sprockets 20*a* straddle cover turnover sprockets 20*b* on axle 22. Cover return sprockets (not shown) having the same pitch diameter and size and number of teeth as cover turnover sprockets 20*a* journal in frame 10 to the right of and at the same level between burner ports 16 and 18 as cup turnover sprockets 20*a***.

A cover flight 14 slides horizontally from left to right on upper tracks **30*a* above the level of burner ports 18 and from right to left on lower tracks 30*b* below the level of burner ports 18 and above those of burner ports 16, as shown in FIG. 3. Cover flight 14 engages both cover turnover sprockets 20*b* and cover return sprockets (not shown), respectively, on chain strands 19 which slide on upper and lower tracks 30*a* and 30*b* mounting on opposite sides of frame 10 on horizontal pitch planes. Bracket members 32 pivotally mount on roller centerpins 23 on links of chain strands 19 on the pitch planes of the same and extend across the cover flight 14 in coordination with and support of a plurality of covers 34 spaced in transverse relation thereon. Each cover 34 on the cover flight 14 registers in fixed cup-and-cover relation with a corresponding cup 17 on the cup flight 12, as the cup-and-cover flights 12 and 14 return from the return sprockets (not shown) and turn over in coordinate relation about sprockets 20***a* and 20*b*, respectively.

In the operation of the turnover mechanism, as shown in FIGS. 1 and 2, the chain strands 13 of cup flight 12 slide on upper and lower tracks 28*a* and 28*b* to engage cup turnover sprockets 20*a*, cup lift sprockets 24, and cup return sprockets (not shown) at the ends thereof. In a similar manner, the chain strands 19 of cover flight 14 slide on upper and lower tracks 30*a* and 30*b*, respectively, to engage cover turnover sprockets 20*b* and cover return sprockets (not shown) also at the ends of the same. Cups 17, which mount on bracket member 15 of flight 12, move over burner ports 16 from right to left on lower tracks 28*b* in upright position for bottom-grilling of muffins and from left to right over burner ports 18 in inverted position on upper track 28*a* to lift sprocket 24. Covers 34, which mount on bracket member 32 of flight 14, move over burner ports 18 from left to right with cups 17 removed as hearth plates for top-grilling of muffins and over burner ports 16 from right to left as covers of cups 17 for bottom-grilling of muffins.

The rims of cups 17 on flight 12 and the under sides of covers 34 on flight 14 mutually coordinate in fixed cup-and-cover relation from linear transport for bottom-grilling and top-grilling on the pitch planes of chains 13 and 19 to turn over on the pitch circles of said turnover sprockets 20*a* and 20*b* by coordinated rotation about roller centerpins 11 and 23 on the pitch planes of each of the corresponding links of the chain strands 13 and 19.

Although but one specific embodiment of this invention is herein shown and described, it will be understood that details of the construction shown may be altered or omitted without departing from the spirit of the invention as defined by the following claims.

I claim:

1. In a continuous griddle for grilling shaped muffins having a frame with upper and lower levels of burner ports below chain-conveyed cup and cover flights for transport of the muffins thereover, and sprockets adjacent to the end thereof for turnover of the same, the improvement in turnover sprockets of the cup and cover and muffin therein comprising first sprockets mounted in spaced relation on said axle in engagement with said cup flight, and second sprockets having the same pitch diameters and size and number of teeth as said first sprockets mounted astraddle said first sprockets in engagement with said cover flight.

2. In a continuous griddle for grilling shaped muffins having a frame with upper and lower levels of burner ports therealong and a turnover axle in an inbetween relation with said burner levels at one end thereof, the improvement in cup-and-cover turnover mechanism comprising:

(a) a first plurality of turnover chain sprockets having a given pitch diameter and size and number of sprocket teeth mounted in spaced axial and circumferentially-coordinated tooth relation on the turnover axle for turnover of the cover;

(b) a second plurality of turnover chain sprockets having the same pitch diameter and size and number of sprocket teeth as those of the cover turnover chain sprockets straddle-mounted in axial operation relation about said cover turnover sprockets and angularly-mounted in circumferential relation about said turnover axle for turnover of the cup;

(c) a cup flight having a plurality of chain strands in engagement with the cup turnover sprockets;

(d) a cover flight operationally within the cup flight having a plurality of chain strands in engagement with the cover turnover sprockets;

(e) a plurality of covers transversely mounted on brackets extending between and having the under sides thereon coincident with the pitch planes of the chain strands of the cover flight and tangent to the pitch circles of the turnover sprockets; and (f) a plurality of cups transversely mounted on brackets extending between and having the rims thereof coincident with the pitch planes of the chain strands of the cup flight and tangent to the pitch circles of the turnover sprockets astraddle the cover flights.

* * * * *